No. 711,574.  
F. R. LONGSTREET.  
WIRE FENCE.  
(Application filed Dec. 7, 1901.)  
Patented Oct. 21, 1902.

(No Model.)

Witnesses:
T. R. Sheppard.
M. W. Clarke.

Inventor:
F. R. Longstreet.

UNITED STATES PATENT OFFICE.

FITZ RANDOLPH LONGSTREET, OF GAINESVILLE, GEORGIA.

WIRE FENCE.

SPECIFICATION forming part of Letters Patent No. 711,574, dated October 21, 1902.

Application filed December 7, 1901. Serial No. 85,083. (No model.)

*To all whom it may concern:*

Be it known that I, FITZ RANDOLPH LONGSTREET, a citizen of the United States, residing at Gainesville, in the county of Hall and State of Georgia, have invented an Improvement in Fences, especially those made of wire, of which the following is a specification.

My invention is to make a fence for inclosing horses, cattle, sheep, &c., of a cheap and simple construction, that will not injure or cut them, and yet repel them from violent contact therewith. I attain these conditions in the improvement herewith described and illustrated.

Figure 1:
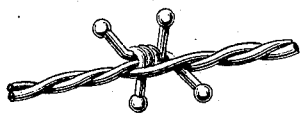
Figure 2:
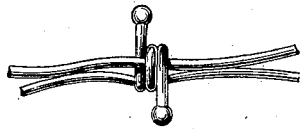
Figure 3:

My improvement consists in substituting for the common sharp-pointed barbs as used on wire fences barbs of or about the same length having their ends rounded or ball-tipped, as shown in the drawings at $a\ a\ a\ a$, &c., in Figures 1, 2, and 3, these ball-tipped barbs to be attached in any form to the line-wires at regular intervals or distances and the ball-points made to extend in opposite directions, as shown in the drawings, Figs. 1, 2, and 3.

Fig. 1 in the drawings represents how two ball-tipped barbs $a\ a\ a\ a$ may be attached to each other and to a two-wire twisted strand. Fig. 2 represents a single ball-tipped barb $a\ a$, attached to a two-wire strand, and Fig. 3 is a side view of Fig. 2.

These ball-tipped barbs attached along a line of one or more strand-wires at intervals, as set forth, I claim will produce a fence of sufficient strength and roughness to repel stock from violent contact therewith and yet cannot and will not injure or lacerate them.

These ball-tipped barbs might be used on other styles of fencing and make them more visible and effective.

What I claim is—

1. A barb for wire fences, having at the ends of said barb a ball-tipped formation, as set forth.

2. A barbed wire, consisting of a line-wire, having connected therewith a series of ball-tipped barbs at intervals, as set forth.

3. A barbed wire, consisting of a line-wire formed of a plurality of strands, and ball-tipped barbs intertwisted therewith at intervals, as set forth.

FITZ RANDOLPH LONGSTREET.

Witnesses:
 HERMAN SCHREINER,
 ABRAHAM HAYSON.